(12) United States Patent
Stahl

(10) Patent No.: US 6,715,272 B2
(45) Date of Patent: Apr. 6, 2004

(54) DEVICE AND METHOD FOR SUPPORTING A SELF-POWERED HEDGE CUTTER

(76) Inventor: Ira Stahl, 2850 Mt. Carmel Ave., Glenside, PA (US) 19038

( * ) Notice: Subject to any disclaimer, the term of this patent is extended or adjusted under 35 U.S.C. 154(b) by 0 days.

(21) Appl. No.: 10/194,172

(22) Filed: Jul. 15, 2002

(65) Prior Publication Data

US 2004/0006961 A1 Jan. 15, 2004

(51) Int. Cl.⁷ .................... A01D 34/64; A01G 3/04
(52) U.S. Cl. ............................ 56/233; 56/16.7
(58) Field of Search ................. 56/233, 16.7, 17.1, 56/17.6, DIG. 9, 234–238

(56) References Cited

U.S. PATENT DOCUMENTS

| | | | | |
|---|---|---|---|---|
| 1,262,393 A | * | 4/1918 | Schaeffer | 56/237 |
| 1,930,934 A | * | 10/1933 | Healy | 56/237 |
| 2,082,610 A | * | 6/1937 | Bankson | 56/237 |
| 2,762,186 A | | 9/1956 | Janata | 56/233 |
| 2,798,354 A | * | 7/1957 | O'Brien et al. | 56/235 |
| 3,433,005 A | * | 3/1969 | Deigaard et al. | 56/235 |
| 3,703,803 A | | 11/1972 | McClure | 56/237 |
| 3,731,476 A | | 5/1973 | Burgess | 56/237 |
| 3,805,501 A | | 4/1974 | Cole | 56/237 |
| 3,952,490 A | * | 4/1976 | Brockman | 56/400.14 |
| 3,961,468 A | | 6/1976 | Brown et al. | 56/237 |
| 4,174,604 A | | 11/1979 | Wilson, Sr. et al. | 56/237 |
| 4,577,457 A | | 3/1986 | Grant | 56/235 |
| 5,070,685 A | | 12/1991 | Galt | 56/16.7 |
| 5,251,428 A | * | 10/1993 | Gay | 56/16.7 |
| 6,009,695 A | | 1/2000 | Karas | 56/237 |

FOREIGN PATENT DOCUMENTS

| | | | | |
|---|---|---|---|---|
| DE | 2651425 A1 | * | 11/1976 | |
| DE | 2840854 A1 | * | 9/1978 | |
| DE | 3506816 A1 | * | 8/1986 | A01G/3/00 |
| DE | 19733073 A1 | * | 2/1999 | A01G/3/04 |
| FR | 2587585 A1 | * | 3/1987 | A01G/3/04 |

\* cited by examiner

*Primary Examiner*—Robert E. Pezzuto
*Assistant Examiner*—Alicia Torres
(74) *Attorney, Agent, or Firm*—LaMorte & Associates

(57) ABSTRACT

An assembly for holding a self-powered hedge cutter at a selected height and orientation so that a hedgerow can be more readily and consistently trimmed. The assembly includes a wheeled base that is filled with a weighted material. A vertical support extends upwardly from the base. A support bracket is provided that is free to move up and down along the length of the vertical support. A push handle also extends from the base. The push handle enables a person to readily push the wheeled base to a desired location. Controls are attached to the push handle. One control adjusts the height of the support bracket on the vertical support. The other control is a throttle control that can be selectively attached to the hedge cutter. A self-powered commercial hedge cutter is temporarily mounted to the support bracket. The hedge cutter can be mounted to the support bracket in a plurality of orientations. The hedge cutter can then be rolled along a hedgerow to trim that hedgerow.

11 Claims, 5 Drawing Sheets

DEVICE AND METHOD FOR SUPPORTING A SELF-POWERED HEDGE CUTTER

BACKGROUND OF THE INVENTION

1. Field of the Invention

The present invention relates to hedge cutters of the type that are typically used by homeowners and landscapers to trim hedges and similar shrubs or bushes. More particularly, the present invention relates to devices that are used to support such hedge cutters as they are used.

2. Prior Art Statement

The prior art record is replete with different types of hedge cutters. Over the years, hedge cutters have been manufactured in a variety of different designs. One of the most popular designs is that of a hedge cutter with a sickle bar cutter. A sickle bar cutter has two elongated blades with teeth that extend laterally from the sides of the elongated blade. One cutter is held stationary while the second cutter is reciprocally moved along the length of the stationary cutter. As the various teeth on the blades move past one another, a shearing action is created that is very effective in cutting hedges and similar plant growth.

To reciprocate the sickle bar on a hedge cutter, the hedge cutter is provided with a motor. Depending upon the type of hedge cutter, the motor is typically an A/C electric motor, a battery operated D/C electric motor or a gasoline powered engine. Many thousands of each type of hedge cutter are sold in the United States each year.

When using a hedge cutter, the hedge cutter is typically manually held as it is moved across the surface of a hedgerow or similar landscaping structure. Hedge cutters are heavy, and after time, it becomes very burdensome to hold a hedge cutter. Consequently, many people who have to cut large rows of hedges must rest at times before they can complete the task of trimming. This adds significantly to the time it takes to trim using a hedge cutter.

Electric hedge cutters that use A/C power are popular because they are lightweight. However, such hedge cutters must be tethered to an extension cord, which significantly limits the range and mobility of the hedge cutters. Battery powered and gasoline powered hedge cutters are much more mobile, however, they are heavier and are thus harder to hold.

In an attempt to make the use of hedge cutters less physically demanding, hedge cutters have been designed that are connected to wheeled carts. In this manner, the cart can be pushed along the side of a row of hedges while the hedge cutter cuts. Such prior art cart mounted hedge cutters are exemplified by U.S. Pat. No. 3,703,803 to McClure, entitled Mobile Variable Head, Hedge Trimmer and U.S. Pat. No. 2,762,186 to Janata, entitled Hedge-Trimming Machine. One problem associated with such cart mounted hedge cutters is that the hedge cutter cannot be removed from the cart. Accordingly, a homeowner or landscaper must own a separate hedge cutter to trim non-linear surfaces, such as rounded bushes. Another problem with such prior art devices is that the hedge cutters cannot be adjusted in height while the hedge cutter is cutting. Rather, the hedge cutter must be stopped and adjusted using hand tools.

U.S. Pat. No. 3,805,501 to Cole, entitled Hedge Trimmer Carriage discloses a cart that retains a self-powered hedge cutter. However, only a lightweight hedge cutter with a straight handle can be used. Most hedge cutters do not have straight handles that can be connected to the Cole device. Furthermore, the position that the hedge cutter is held cannot be adjusted while the hedge cutter is in operation.

A need therefore exists for an improved hedge cutter support cart that can be used to hold most any existing hedge cutter, yet enables the hedge cutter to be easily removed. A need also exists for a support for a hedge cutter that can be readily adjusted in position while the hedge cutter is in the operation of cutting. These needs are met by the present invention as described and claimed below.

SUMMARY OF THE INVENTION

The present invention is an assembly for holding a self-powered hedge cutter at a selected height and orientation so that a hedgerow can be more readily and consistently trimmed. The assembly includes a wheeled base that is filled with a weighted material. A vertical support extends upwardly from the base. A support bracket is provided that is free to move up and down along the length of the vertical support. A push handle also extends from the base. The push handle enables a person to readily push the wheeled base to a desired location.

Controls are attached to the push handle. One control adjusts the height of the support bracket on the vertical support. The other control is a throttle control that can be selectively attached to the hedge cutter.

A self-powered commercial hedge cutter is temporarily mounted to the support bracket. The hedge cutter can be mounted to the support bracket in a plurality of orientations. The present invention assembly enables the hedge cutter to be set at a selected orientation and height. The hedge cutter can then be rolled along a hedgerow to trim that hedgerow. The height at which the hedge cutter is mounted can be adjusted as the hedge cutter is cutting by operating the adjustment control on the push handle. Similarly, the throttle of the hedge cutter can also be selectively controlled by an adjustment control on the push handle. A user can therefore change the height and speed of the hedge cutter as it is being rolled along a hedgerow.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
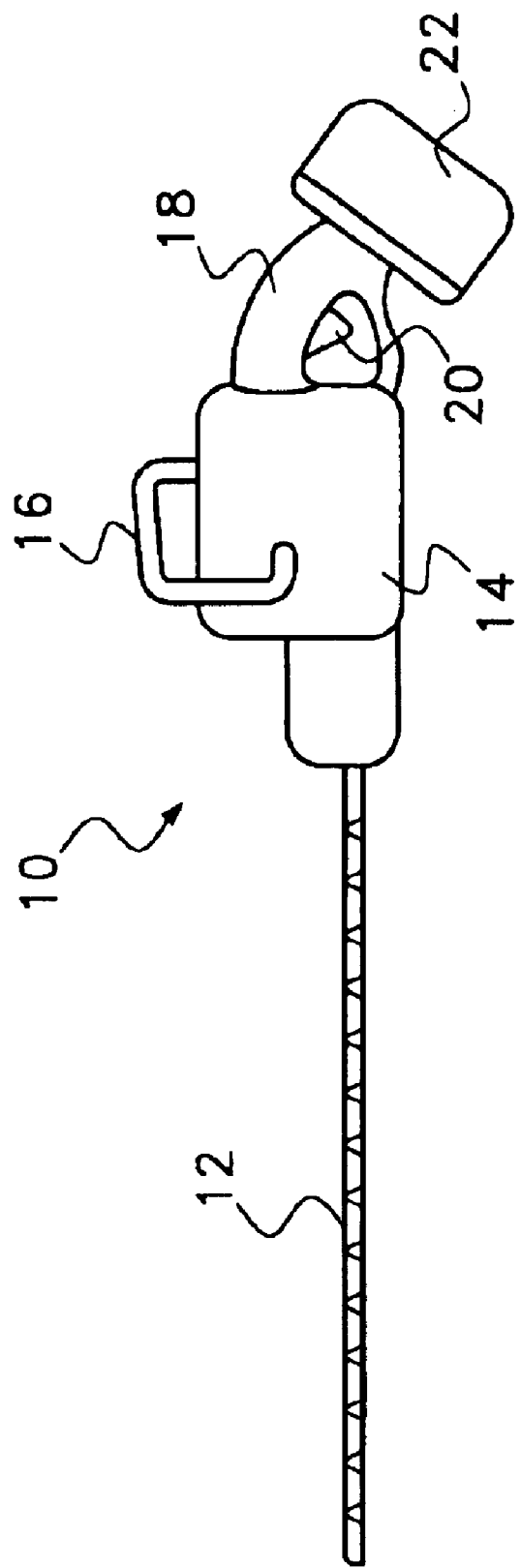
FIG. 1 is a side view of a traditional prior art hedge cutter.

Referring to FIG. 1, a typical hedge cutter 10 is shown. Like most all sickle bar hedge cutters, the hedge cutter 10 has a sickle bar 12 that leads into a main housing 14. In the main housing 14 is the motor that reciprocates the sickle bar 12, thereby creating the cutting action. Such hedge cutters 10 typically have two handles, wherein each handle is to be held by one hand of the user. One handle is a cross bar handle 16 that extends across the top of the hedge cutter 10. Commonly, the cross bar handle 16 extends above the center of gravity of the hedge cutter 10. As such, the entire hedge cutter 10 can readily be lifted and carried in a balanced orientation by the cross bar handle 16. The second handle 18 extends from the rear of the main housing 14. The rear handle 18 typically extends from the main housing 14 with a downward slope of between 30° and 60°. Under the rear handle 18 is typically positioned the throttle control 20 for the hedge cutter 10 that controls the speed at which the sickle bar 12 reciprocates.

The positions of the cross bar handle 16, the rear handle 18 and the throttle control 20 remain in a generally consistent range among a majority of the commercially available hedge cutters, regardless of whether the hedge cutters are A/C powered, battery powered or gasoline powered.

In the embodiment of FIG. 1, the hedge cutter 10 is a battery operated hedge cutter. This type of hedge cutter typically has a battery pack 22 that is attached to the rear handle 18. The illustration of such a hedge cutter 10 is merely exemplary and it should be understood that either an A/C powered hedge cutter or a gasoline powered hedge cutter could have been used.

Figure 2:
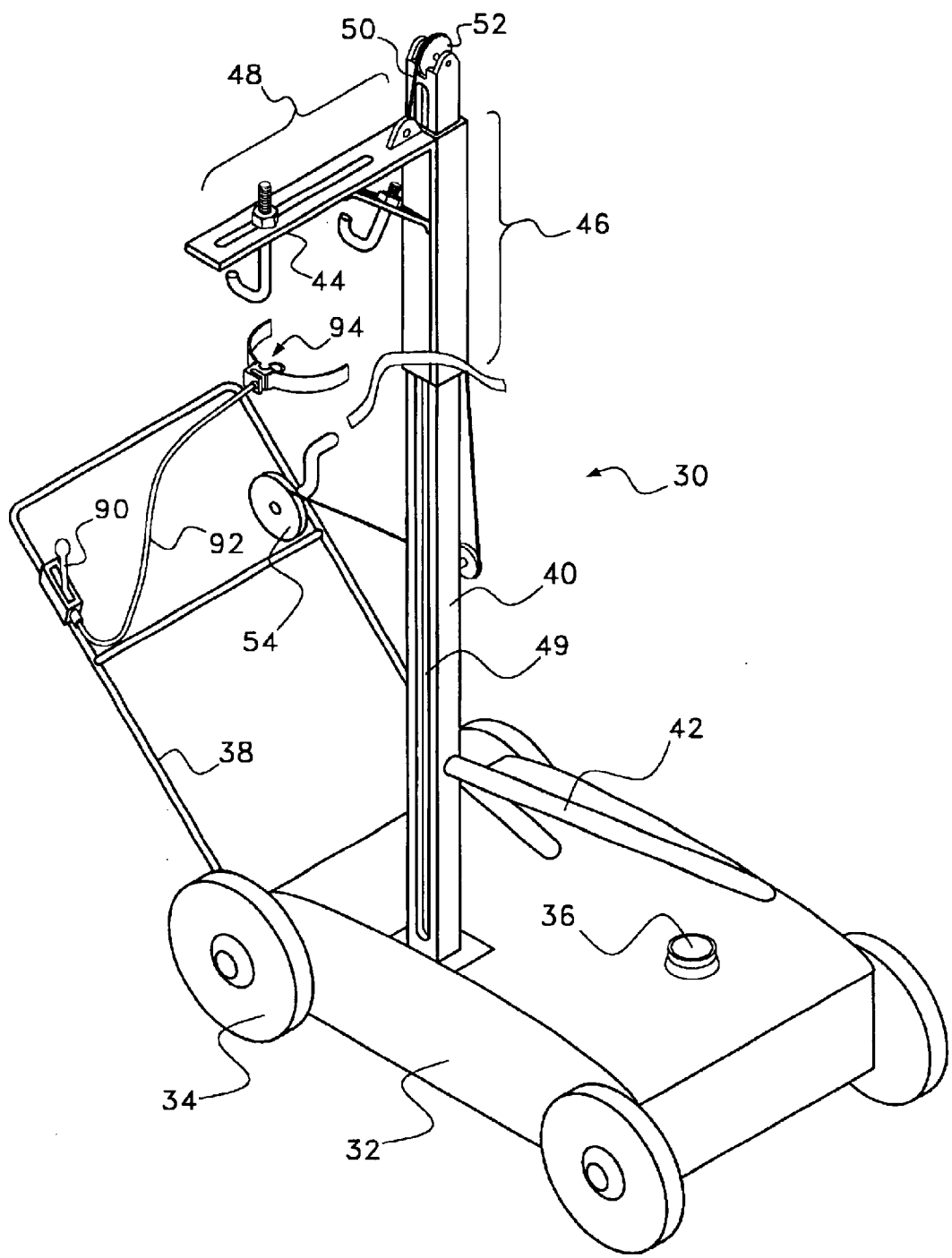
FIG. 2 is a perspective view of an exemplary embodiment of a hedge cutter support assembly in accordance with the present invention.

Referring to FIG. 2, an exemplary embodiment of the present invention hedge cutter support assembly 30 is shown. In this embodiment, there is a base 32. The base 32 is supported by at least three wheels 34 so that the base 32 can be rolled in a forward and rearward direction. The base 32 is preferably a hollow structure that has an access port 36 on its top surface. The access port 36 enables either water or sand to be poured into the interior of the base 32. Once full with either sand or water, the base 32 can have a weight of between thirty pounds and one hundred pounds. This provides the hedge cutter support assembly 30 with a very low center of gravity.

A push handle 38 extends from the base 32. The push handle 38 supports the operational controls for the overall assembly, that will later be explained. The push handle 38 provides an ergonomically efficient manner to push the base 32 forward or pull the base 32 backward.

At least one vertical support 40 extends upwardly from the base 32. The vertical support 40 is rigidly mounted in the vertical plane and may contain support braces 42 to add lateral structural strength to the vertical support 40. The combined vertical length of the base 32 and the vertical support 40 is preferably between three feet and seven feet.

A support bracket 44 is provided that actually connects to the hedge cutter 10 (FIG. 1). The support bracket 44 has two primary sections. There is a vertical section 46 that engages the vertical support 40 in a manner that enables the vertical section 46 to freely slide up and down along the vertical support 40. There is also a horizontal section 48 that connects to the vertical section 46. Consequently, when the vertical section 46 moves up and down, the horizontal section 48 moves in unison with the vertical section 46.

There are many configurations that would enable the vertical section 46 of the support bracket 44 to freely move up and down the length of the vertical support 40. For example, the vertical support can be round and the vertical section of the support bracket can include a tubular guide that rides around the exterior of the vertical support. In the shown example, a slot 49 is formed in the vertical support 40. Track elements extend from the vertical section 46 of the support bracket 44 that engage the slot 49 and enable the support bracket 44 to ride up and down the length of the slot 49. Such an embodiment is merely exemplary and it should be understood that any configuration that enables the support bracket 44 to move along the length of the vertical support 40 can be used.

The support bracket 44 is attached to a cable 50. The cable 50 extends from the top of the support bracket 44 and through a pulley 52 at the top of the vertical support 40. The cable 50 then connects to a bi-directional crank 54 that is located on the push handle 38. By turning the crank 54, the effective length of the cable 50, between the support bracket 44 and the crank 54, can be selectively lengthened or shortened. As the cable 50 is shortened, the support bracket 44 is pulled up the length of the vertical support 40. Conversely, as the length of the cable 50 is increased, the support bracket 44 descends down the length of the vertical support 40.

Figure 3:
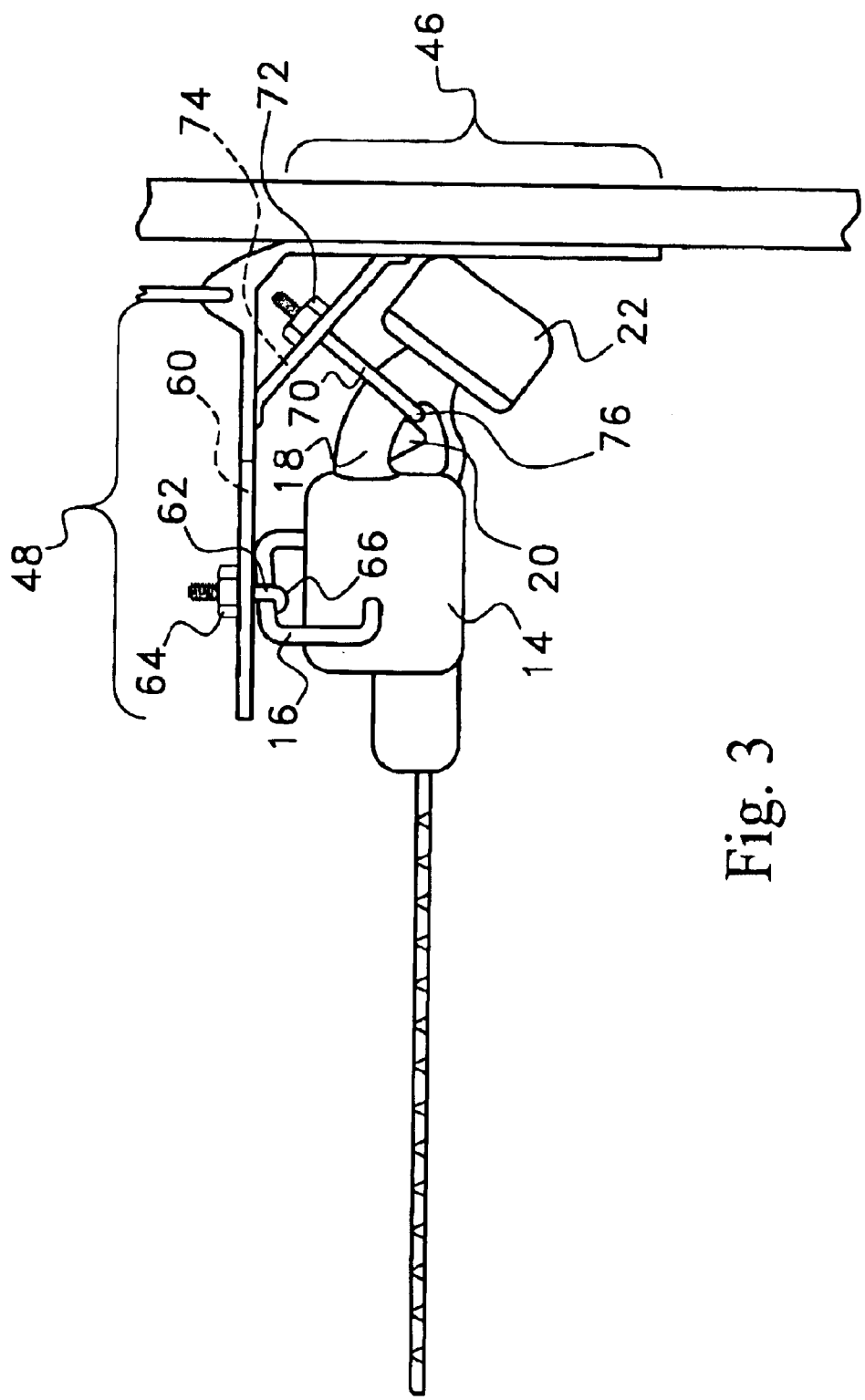
FIG. 3 is a perspective view of a prior art hedge cutter being mounted in a horizontal position to a section of the support assembly that was previously shown in FIG. 2.

Referring to FIG. 3, it can be seen that a slot 60 is formed in the horizontal section 48 of the support bracket 44. A first hook clamp 62 extends through the slot 60 and engages an adjustment knob 64. The hook clamp 62 has a hooked end 66 that passes around the cross bar handle 16 of the hedge cutter 10. As the adjustment knob 64 is tightened, the hook clamp 62 biases the cross bar handle 16 against the horizontal section 48 of the support bracket 44, thereby firmly engaging the cross bar handle 16. The position of the cross bar handle 16 on various makes and models of hedge cutters differ. By providing the slot 60 in the horizontal section 48 of the support bracket 44, the first hook clamp 62 can be adjusted in position to engage the cross bar handle 16 of a large majority of the hedge cutters currently being commercially sold.

A second hook clamp 70 is positioned between the horizontal section 48 of the support bracket 44 and the vertical section 46 of the support bracket 44. The second hook clamp 70 also engages an adjustment knob 72. The second hook clamp 70 extends through an adjustment slot 74 that enables the position of the second hook clamp 70 to be selectively adjusted. The second hook clamp 70 has a hooked end 76 that passes around the rear handle 18 of the hedge cutter 10. As the adjustment knob 72 is tightened, the second hook clamp 70 biases the rear handle 18 against the support bracket 44, thereby firmly engaging the rear handle 18. The position of the rear handle 18 on various makes and models of hedge cutters 10 are different. By providing the slot 60 in the horizontal section 48 of the support bracket 44, the second hook clamp 70 can be adjusted in both position and angle to engage the rear handle 18 of a large majority of the hedge cutters currently being commercially sold.

From the position of the first hook clamp 62 and the second hook clamp 70, it will be understood that a commercial hedge cutter 10 can be selectively attached to the support bracket 44 in an orientation that holds the sickle bar blade 12 of the hedge cutter 10 in the horizontal. In this orientation, the assembly can be advanced along the side of a hedgerow and the hedge cutter 10 can cut the tops of the hedgerow to a consistent height.

Figure 4:
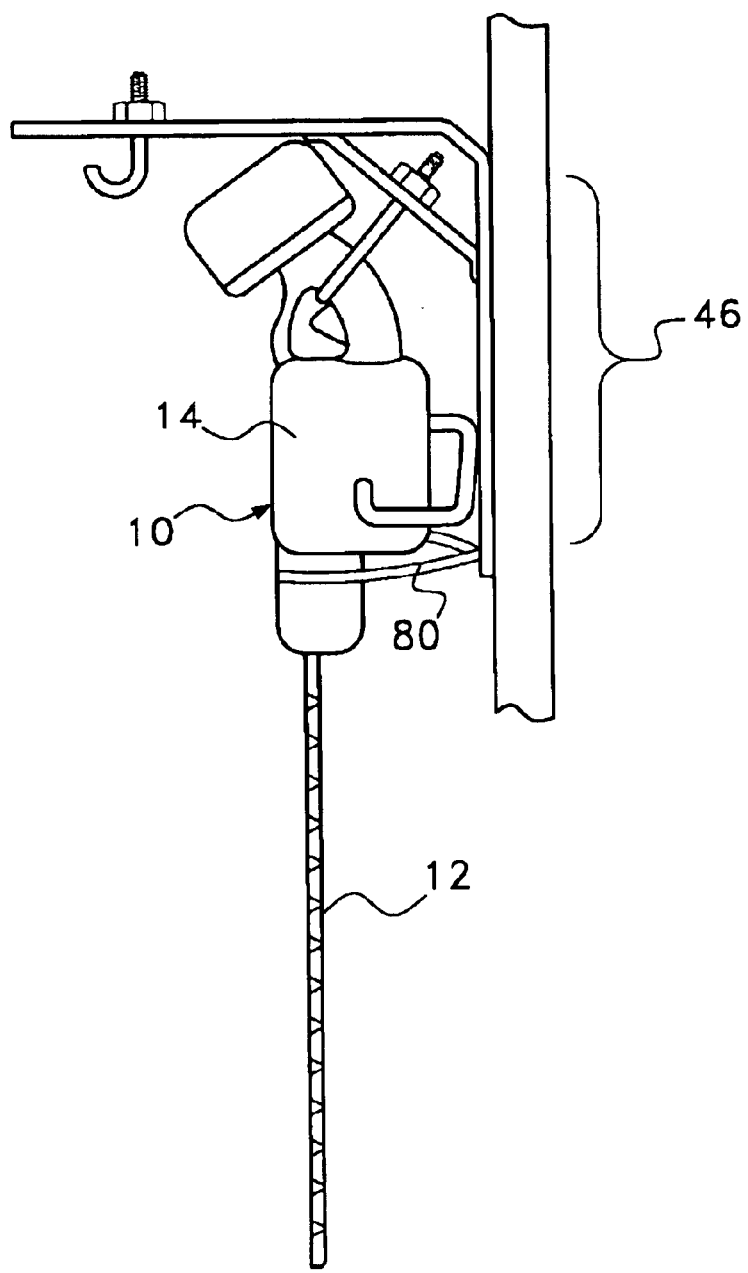
FIG. 4 is a perspective view of a prior art hedge cutter being mounted in a vertical position to a section of the support assembly that was previously shown in FIG. 2.

Referring now to FIG. 4, it can be seen that an attachment strap 80 is positioned toward the bottom of the vertical section 46 of the support bracket 44. The hedge cutter 10 can be mounted in a vertical position utilizing the second hook clamp 70 and the attachment strap 80. Once the hedge cutter 10 is oriented in the vertical plane, the rear handle 18 of the hedge cutter 10 is then engaged using the second hook clamp 70. The housing 14 of the hedge cutter 10 is then engaged with the attachment strap 80, thereby rigidly mounting the hedge cutter 10 to the support bracket 44 in a vertical orientation.

From the position of the second hook clamp 70 and the attachment strap 80, it will be understood that a commercial hedge cutter can be selectively attached to the support bracket 44 in an orientation that holds the sickle bar blade 12 of the hedge cutter 10 in the vertical. In this orientation, the assembly can be advanced along the side of a hedgerow and the hedge cutter 10 can cut the sides of the hedgerow to a straight vertical plane.

Although some electrically powered hedge cutters only have on/off switches, most commercially available hedge cutters have a throttle control. The throttle control is the generic name herein given to any control that selectively adjusts the speed at which the hedge cutter operates. In most all commercially available hedge cutters, the throttle control is a lever control that is positioned under the rear handle.

In the present invention, a throttle adjustment mechanism is provided that enables a person using the present invention device to control the throttle of the hedge cutter while pushing the device. Referring briefly back to FIG. 2, it can be seen that a manual lever control 90 is provided on the push handle 38 of the assembly. The lever control 90 is attached to a cable 92 that extends to an engagement assembly 94. The engagement assembly 94 attaches to a hedge cutter near its throttle control and interconnects the lever control 90 to the throttle control. In this manner, the throttle control of the hedge cutter can be selectively controlled by moving the lever control 90.

Figure 5:
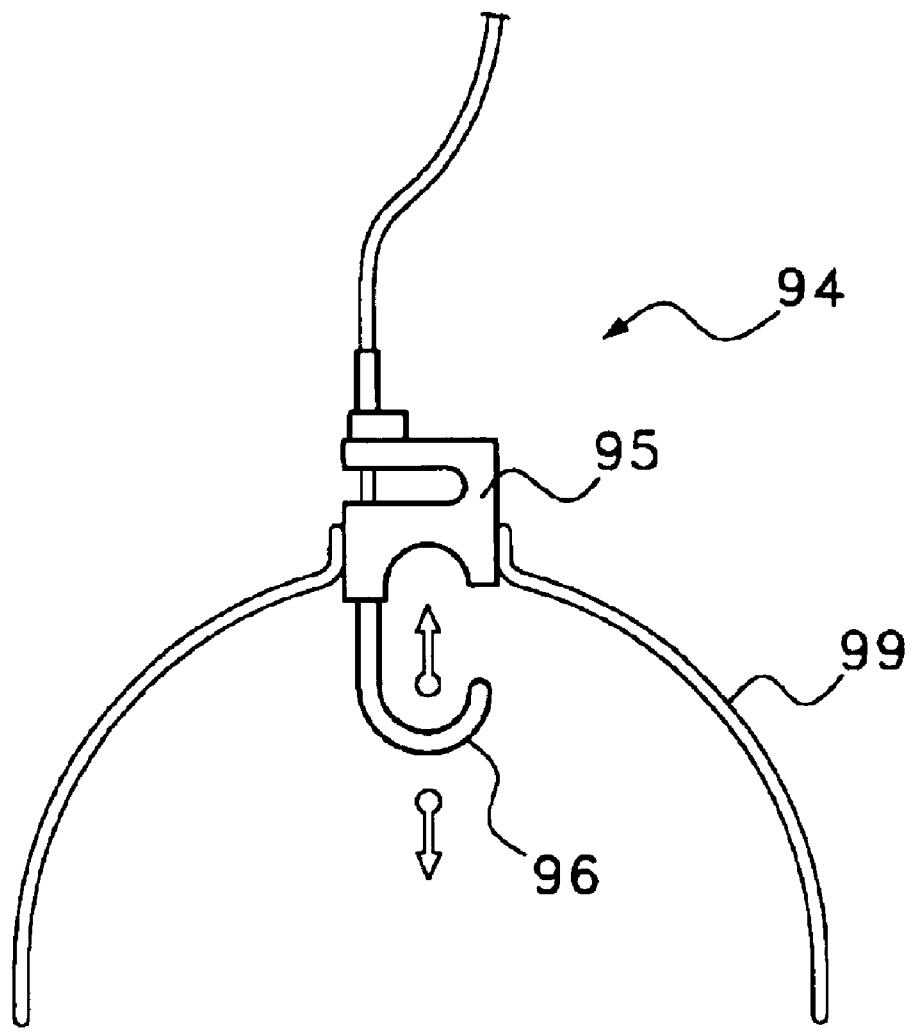
FIG. 5 is an enlarged view of a segment of the throttle control that connects to a hedge cutter.

Referring to FIG. 5, the details of an exemplary embodiment of the engagement assembly 94 are shown. The engagement assembly 94 includes a base 95. A finger element 96 extends through the base 95. The finger element 96 is directly connected to the cable 92. The rear handle 18 (FIG. 1) and throttle control 20 (FIG. 1) of the hedge cutter are placed between the finger element 96 and the base 95. When the cable 92 is tightened, the finger element 96 moves toward the base 95, thereby squeezing the throttle control 20 (FIG. 1). When the cable 92 is slackened, the finger element 96 moves away from the base 95 and the throttle control 20 (FIG. 1) is not engaged. The engagement assembly 94 is held in place on the rear handle 18 (FIG. 1), over the position of the throttle control 20 (FIG. 1), using straps 99. The straps 99 preferably contain hook and loop fastening material for easy adjustment.

It will be understood that the assembly and method of the present invention described and illustrated herein are merely exemplary and a person skilled in the art can make many variations to the shown embodiment. For example, the hook clamps used to attach the hedge cutter to the support bracket can be replaced with any other types of clamps or mechanical fasteners. Furthermore, the shape of the base, the orientation of support braces and the like can be configured to the whims of a designer. All such alternate embodiments and modifications are intended to be included within the scope of the present invention as defined below in the claims.

What is claimed is:

1. A support device for a hedge cutter of the type having a top cross bar handle and a rear handle, said device comprising:
   a wheeled base;
   a push handle coupled to said wheeled base for selectively moving said wheeled base;
   a vertical support extending above said wheeled base;
   a support bracket engaging said vertical support, wherein said support bracket can move along said vertical support through a predetermined range; said support bracket having a vertical section that extends along said vertical support and a horizontal section that extends from the vertical section;
   an adjustment mechanism for selectively adjusting said support bracket to a position in said predetermined range, wherein said adjustment mechanism is manually adjustable from a location on said push handle;
   a first mechanical engagement device extending from said support bracket for selectively engaging the cross bar handle of the hedge cutter; and
   a second mechanical engagement device disposed on said vertical section of said support bracket for selectively engaging the rear handle of the hedge cutter.

2. The device according to claim 1, wherein said wheeled base defines an internal chamber that can be selectively filled with a weighted material selected from a group consisting of water and sand.

3. The device according to claim 1, wherein said adjustment mechanism includes a crank that is mounted to said push handle and a tether that extends from said crank to said support bracket and wherein said crank selectively moves the support bracket throughout said predetermined range by selectively lengthening and shortening said tether.

4. The device according to claim 1, wherein said first mechanical engagement device is disposed on said horizontal section of said support bracket.

5. The device according to claim 4, wherein said first mechanical engagement device is selectively adjustable in position on said horizontal section of said support bracket.

6. The device according to claim 1, wherein said second mechanical engagement device is selectively adjustable in position on said support bracket.

7. The device according to claim 1, further including a throttle control mechanism, wherein said throttle control mechanism includes a manual control mounted to said push handle and a cable activated mechanism that can be selectively mounted to the hedge cutter.

8. An assembly, comprising:
   a hedge cutting machine having an elongated sickle bar cutter, a motor for reciprocating said sickle bar cutter, a throttle control for selectively controlling the speed of the motor, a cross bar handle and a rear handle;
   a support bracket having a vertical section and a horizontal section that extends from the vertical section;
   a first mechanical engagement device extending from said support bracket for selectively engaging the cross bar handle of the hedge cutter;
   a second mechanical engagement device disposed on said vertical section of said support bracket for selectively engaging the rear handle of the hedge cutter;
   a wheeled base;
   a push handle coupled to said wheeled base for selectively moving said wheeled base;
   a vertical support extending above said wheeled base, wherein said vertical section of said support bracket engages said vertical support and is free to move along said vertical support through a predetermined range; and
   an adjustment mechanism for selectively adjusting said support bracket to a position in said predetermined range, wherein said adjustment mechanism is manually adjustable from a location on said push handle.

9. The assembly according to claim 8, wherein hedge cutting machine is selectively positionable on said support bracket between a first orientation, wherein said sickle bar cutter extends horizontally, and a second orientation, wherein said sickle bar cutter extends vertically.

10. The assembly according to claim 8, wherein said wheeled base defines an internal chamber that can be selectively filled with a weighted material selected from a group consisting of water and sand.

11. The assembly according to claim 8, wherein said adjustment mechanism includes a crank that is mounted to said push handle and a tether that extends from said crank to said support bracket and wherein said crank selectively moves the support bracket throughout said predetermined range by selectively lengthening and shortening said tether.

* * * * *